United States Patent
Yadha et al.

(10) Patent No.: US 9,509,002 B2
(45) Date of Patent: Nov. 29, 2016

(54) QUICK RESTART OF FUEL CELL POWER PLANT AS ALTERNATIVE TO IDLING

(75) Inventors: Venkateshwarlu Yadha, Richardson, TX (US); Matthew P. Wilson, Groton, CT (US); Matthew I. Riley, San Francisco, CA (US); Sitaram Ramaswamy, West Hartford, CT (US)

(73) Assignee: Audi AG, Ingolstadt (DE)

( * ) Notice: Subject to any disclaimer, the term of this patent is extended or adjusted under 35 U.S.C. 154(b) by 731 days.

(21) Appl. No.: 13/261,523

(22) PCT Filed: May 20, 2010

(86) PCT No.: PCT/US2010/001485
§ 371 (c)(1),
(2), (4) Date: Nov. 19, 2012

(87) PCT Pub. No.: WO2011/146041
PCT Pub. Date: Nov. 24, 2011

(65) Prior Publication Data
US 2013/0108941 A1    May 2, 2013

(51) Int. Cl.
*H01M 8/04* (2016.01)
*B60L 11/18* (2006.01)

(52) U.S. Cl.
CPC ...... *H01M 8/04298* (2013.01); *B60L 11/1885* (2013.01); *H01M 8/04201* (2013.01); *H01M 8/04223* (2013.01); *H01M 2250/20* (2013.01); *Y02E 60/50* (2013.01); *Y02T 90/32* (2013.01); *Y02T 90/34* (2013.01)

(58) Field of Classification Search
CPC ......... B60L 11/1885; H01M 2250/20; H01M 8/04201; H01M 8/04223; H01M 8/04298; Y02E 60/50
See application file for complete search history.

(56) References Cited

U.S. PATENT DOCUMENTS

| 4,202,933 | A | 5/1980 | Reiser et al. |
| 4,849,545 | A | 7/1989 | Fanizzi et al. |
| 6,984,464 | B2 | 1/2006 | Margiott et al. |
| 7,141,324 | B2 | 11/2006 | Margiott et al. |
| 7,377,345 | B2 | 5/2008 | Hasuka et al. |

(Continued)

FOREIGN PATENT DOCUMENTS

| JP | 2004-56868 A | 2/2004 |
| JP | 2007-128778 A | 5/2007 |

(Continued)

OTHER PUBLICATIONS

International Search Report, mailed Feb. 25, 2011, for International Application No. PCT/US2010/001485, 2 pages.

*Primary Examiner* — Carlos Barcena
*Assistant Examiner* — Lilia V Nedialkova
(74) *Attorney, Agent, or Firm* — Seed IP Law Group LLP

(57) ABSTRACT

A fuel cell power plant keeps track, such as with a fuel-off timer (41), of the extent to which shutdown of the fuel cell power plant has occurred, in case the fuel cell power plant is quickly commanded to resume full operation. In one embodiment, if the fuel-off timer has not timed out at the time that the fuel cell power plant is ordered to resume full operation, a fuel-on timer is set (51) equal to the value of the fuel-off timer when the fuel cell power plant is ordered to resume full operation. Then, the fuel cell power plant is refueled (22), in a duration of time related to the setting of the fuel-off timer, rather than doing a full fuel purge.

6 Claims, 2 Drawing Sheets

(56) References Cited

U.S. PATENT DOCUMENTS

| | | | |
|---|---|---|---|
| 2003/0134167 A1* | 7/2003 | Hirakata | 429/22 |
| 2004/0013920 A1 | 1/2004 | Hasuka et al. | |
| 2008/0182138 A1* | 7/2008 | Salvador | H01M 8/04164 |
| | | | 429/429 |
| 2009/0047555 A1* | 2/2009 | Sugawara | H01M 8/04089 |
| | | | 429/410 |
| 2010/0266912 A1* | 10/2010 | Lerner et al. | 429/429 |
| 2011/0087441 A1* | 4/2011 | Salvador | H01M 8/04223 |
| | | | 702/24 |

FOREIGN PATENT DOCUMENTS

| | | |
|---|---|---|
| JP | 2007-265653 A | 10/2007 |
| KR | 10-0708273 B1 | 4/2007 |

\* cited by examiner

QUICK RESTART OF FUEL CELL POWER PLANT AS ALTERNATIVE TO IDLING

TECHNICAL FIELD

A fuel cell power plant, such as one providing electricity to power an electric vehicle, that are frequently allowed to idle when little or no power is being required in order to avoid the two or three minutes typically required to restart the fuel cell power plant is provided with quick restart when having been shut down only a short time before, to reduce the need to idle.

BACKGROUND ART

Proton exchange membrane fuel cells are considered to be quite suitable for applications in which the fuel cell power plant will provide electricity to the electric motor of a vehicle. In some applications, such as city buses and package delivery trucks, the vehicle makes frequent stops, mostly for short periods of time. Whenever the electric motor is demanding little or no power from the fuel cell, the current density is very low and the voltage of the cells rise close to open circuit potentials. Although charging of batteries can assist in avoiding the increased potentials, that cannot happen when the state of charge is high.

A practice of shutting down the fuel cell, rather than letting it idle, has seldom been used because once the fuel cell is shut down, it takes a few minutes to get it into full operation again. Thus, the continued preference among operators is for idling, even though oxidation of the catalyst, particularly at the cathode, will occur.

SUMMARY

To avoid idling, what is needed is a quick restart function to facilitate restart whenever the vehicle provides a start command shortly after the fuel cell power plant has been commanded to shut down. Providing the control system of the fuel cell power plant with the ability for a rapid restart primarily requires reducing the time necessary a) to get the thermal management system operating and b) to accomplish all or part of the fuel supply startup procedure relevant to a normal startup.

In one embodiment, the time since initiating turn off of the fuel system during a shutdown is monitored, so that if restart is commanded soon thereafter, the extent of fuel purge can be made commensurate (proportionately brief), rather than having it be the same as it would during a normal startup after a much longer shut-down period, such as at the start of an operational day. In one embodiment, the thermal management (or temperature management) system is not turned off during a shutdown until the fuel system has had adequate time to be fully turned off. This makes it less likely that the fuel management system will have to be totally filled unless an extensive shutdown will occur.

Other variations will become more apparent in the light of the following detailed description of exemplary embodiments, as illustrated in the accompanying drawings.

MODE(S) OF IMPLEMENTATION

Figure 1:
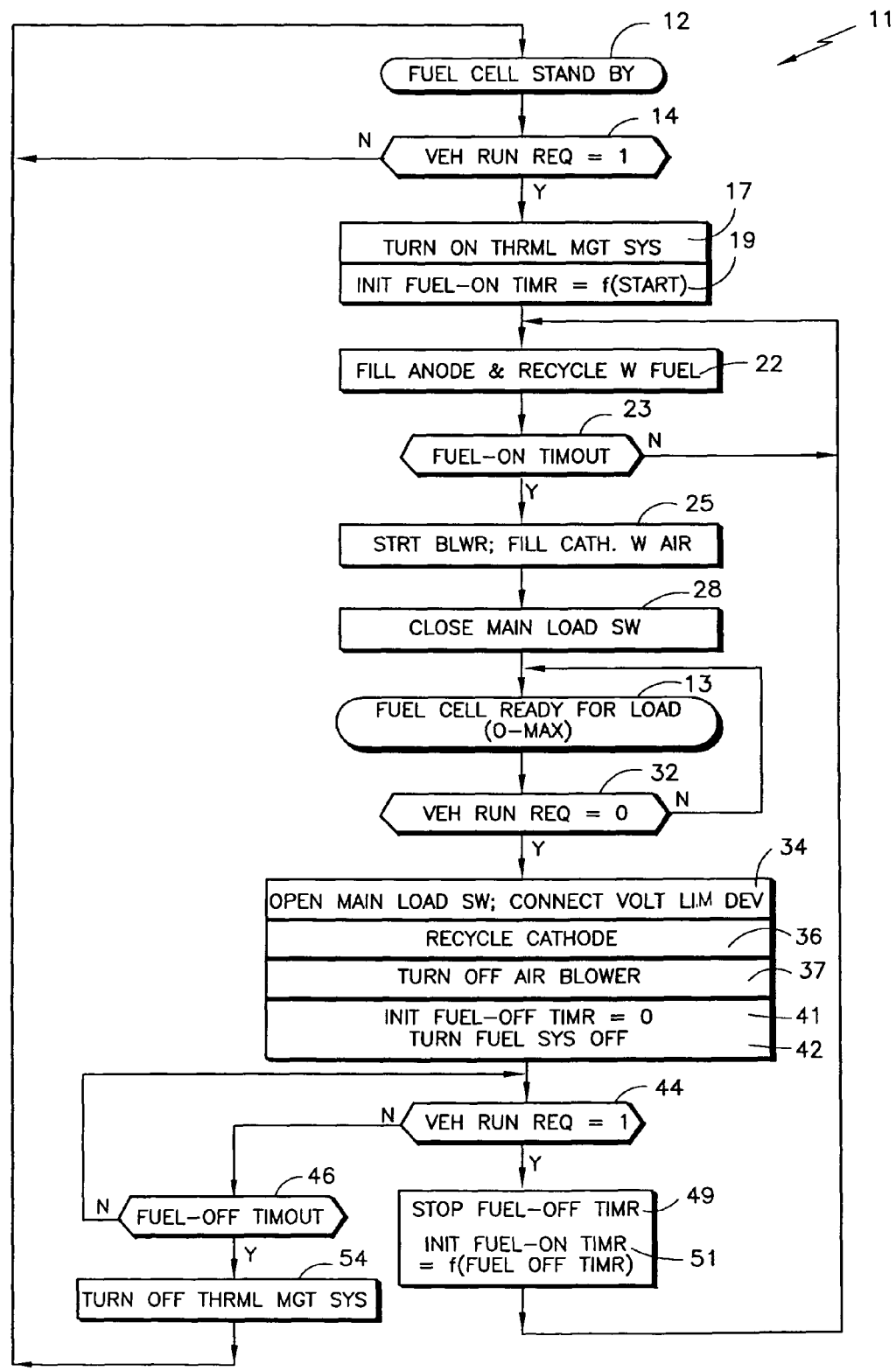
FIG. 1 is a simplified functional diagram illustrating an embodiment of quick restart of a fuel cell power plant.
Figure 2:
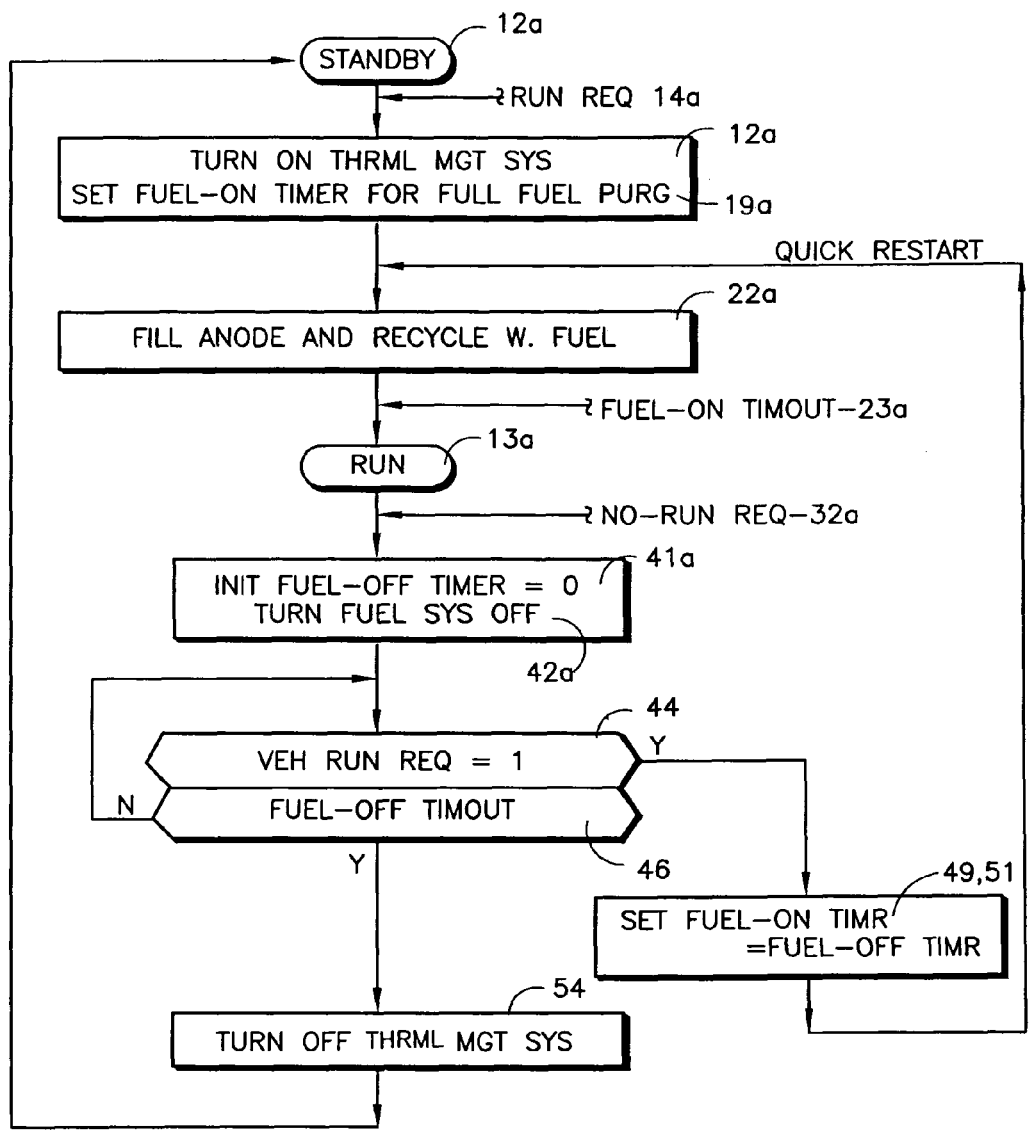
FIG. 2 is a simplified version of FIG. 1, illustrating the quick start feature more clearly.

Referring to FIG. 1, a method 11, for assisting in the quick restart of a fuel cell power plant, has two stable modes: (1) a fuel cell standby mode 12 when the fuel cell is turned off and the controller of the fuel cell is waiting for a vehicle request for the fuel cell power plant to run and (2) a ready-for-load mode 13. Because there are significant differences between the major control loops of various fuel cell power plants, the illustration in the figure has been simplified by omitting events that indicate completion of any particular step or required condition. For instance, adequate cathode gas recycle may be achieved in one power plant by proper valve adjustments and blower operation for a given predetermined period of time. Alternatively, a hydrogen sensor in the cathode gas stream may be used as an indicator that the cathode recycle to consume oxygen gas has been completed. The manner of causing step advancements is not germane to the quick restart herein. It is assumed that all such particular details will be easily accommodated once the exemplary embodiment of quick restart is apparent.

So long as a test 14 is negative, the fuel cell power plant will remain in the standby mode 13. Once the vehicle provides a run request, a vehicle run request flag is set equal to "1" and test 14 is affirmative. Other manifestations of the need for vehicle power may be used.

To get the fuel cell power plant into operation, a first step may be to turn on the temperature management (or thermal management) system in a step 17. The temperature management system start decision varies depending on the characteristics of the fuel cell power plant, not germane to the disclosure herein. The temperature management system may not be turned on until later in the start up process, or to support reaching operating temperature, or for some other reason.

Next, a step 19 will initiate the setting in a time out timer, identified as a fuel-on timer. The timer is set to a value which will vary as a function of the fuel cell power plant's operational state when the start request is received. The operational state varies from being started up from having been fully shut down, in contrast with being started up using a quick restart process, as described more fully hereinafter. The time set in the timer will be such as to provide the necessary fuel purge.

A step 22 initiates a process of filling the anode and fuel recycle plumbing with fuel. An associated test 23 determines if the fuel-on timer has timed out or not; so long as it has not, the fueling in response to step 22 will continue. Once the fuel-on timer has timed out, an affirmative result of test 23 reaches a step 25 which causes the blower to start to fill the cathode with air. Then, a step 28 can close the main load switch so as to advance the status of the fuel cell power plant to a mode 29, ready for a load, where the fuel cell power plant is prepared to satisfy any load from zero load to its maximum load. In this mode, normal operation occurs.

For shutting down the fuel cell power plant, the vehicle run request flag is set to "0". This is monitored in a test 32 which retains the fuel cell power plant in the ready for load mode 29 unless the vehicle run request flag is set to "0". An affirmative result of test 32 reaches a step 34 which opens the main load switch and connects the stack to voltage limiting devices. The voltage limiting devices will assist in preventing uncontrolled open circuit cell potentials. A step 36 will cause the cathode exhaust to be recycled to the entrance of the cathode flow fields, so as to reduce oxygen content therein. Oxygen is consumed as the oxygen combines with hydrogen which crosses over from the anode through the membrane and by the cell current drawn through the stack's voltage limiting devices. Once a predetermined interval of cathode recycle has occurred, the air blower is turned off by a step 37.

Following air blower shutdown, a fuel-off, time-out timer is set to a zero count in a step 41. Contemporaneously with step 41 is the turn off of the fuel cell power plant's fuel cell fuel system, in a step 42. When a quick restart procedure is to be used, the characteristics of fuel cell power plant will determine the process used for turning the fuel system off, primarily the length of time necessary to shut off the fuel system. During the time the fuel system is shutting off, a test 44 monitors whether a quick restart is being requested (or not) by testing the vehicle run request flag for a "1". If the run request flag is not equal to "1", a negative result of test 44 initiates a test 46 to determine if the fuel-off timer has timed out. If test 46 is negative, the system returns to test 44. Until time out of the fuel-off timer is reached, if a request to start is indicated by the vehicle run request flag equaling a "1", an affirmative result of test 44 will initiate a step 49 which stops the fuel-off timer. The run time of the fuel-off timer indicates the extent to which the fuel system has completed its turn-off routine. The run time of the fuel-off timer is then used to initiate the fuel-on, time-out timer. The setting for the fuel-on, time-out timer will be a function of the setting in the fuel-off timer, in a step 51. The function can be related to the time established in the fuel-off timer, but may include other parameters such as ambient temperature or pressure, cell stack assembly temperature, elevation of the site, and so forth.

Following step 51, the routine reverts to the step 22 which commands that the anode and recycle plumbing be filled with fuel. The step 22 command is modified so that, instead of utilizing the full duration of time which is required upon an initial startup, a lesser amount of time is used for a quick start-up when the fuel-off timer is set to a lesser time period. The step 23 is testing for a fuel-on time out which is set as a function of the fuel off timer in the step 51. As a result, a full fuel purge may not be required, saving additional startup time.

In the case where the routine advances from the step 51 to the step 22, the temperature management system has not been turned off, thus saving additional start time.

If a vehicle run request is not sensed by the flag equaling "1" in the test 44 before the test 46 determines that the fuel-off timer has timed out, an affirmative result of test 46 causes a step 54 to turn off the thermal management system. This causes reversion to the fuel cell standby mode 13 where the routine will wait until a vehicle request for the fuel cell to run is indicated by the flag of test 14 being set to a "1".

If the moment the step 54 orders turning off of the thermal management system, a vehicle run request is manifested by setting the flag of test 14 equal to a "1", response will be immediate so that the step 17 will be reached prior to any loss of time with respect to the thermal management system. Stated alternatively, the thermal management system can be restored to normal operation directly from any stage, and requires less time depending upon how soon the order to turn it off is countermanded by an order to turn it on. Therefore, this saves time as well.

The invention claimed is:

1. A method, comprising:
a) holding a standby mode until there is selectively provided an indication of the fact that a vehicle having an electric propulsion system powered by a fuel cell power plant currently requires fuel cell system electric power;
b) after standby mode, bringing the fuel cell power plant into a ready-for-load mode in which said fuel cell power plant is capable of providing any load demanded of said fuel cell power plant between no load and a maximum load, including:
  i) turning on a fuel cell thermal management system of the fuel cell power plant,
  ii) initializing a fuel-on timer to a value determined as a function of an operational state of the fuel cell power plant, and
  iii) filling anodes and anode recycle plumbing of the fuel cell power plant with fuel until the fuel-on timer times out;
c) after achieving ready-for-load mode, remaining in the ready-for-load mode until there is selectively provided an affirmative result, from a first vehicle run test, a symbol of the fact that the vehicle currently requires no electric power;
d) after the affirmative result is selectively provided, simultaneously initiating setting a fuel-off timer to zero and initiating a turn-off of a fuel cell fuel system of the fuel cell power plant; and
e) upon a positive result for a second vehicle run test during a duration that precedes time-out of the fuel-off timer, stopping the fuel-off timer and setting the fuel-on timer equal to the fuel-off timer; and
f) returning to the filling of the anodes and anode recycle plumbing of the fuel cell power plant with fuel until the fuel-on timer times out.

2. A method according to claim 1, further comprising:
between time-out of the fuel-on timer and the ready-for-load mode, starting an air blower and filling cathodes of the fuel cell power plant with air, and closing a main load switch to connect the fuel cell power plant to the vehicle.

3. A method according to claim 2, further comprising:
in response to said symbol, opening the main load switch to disconnect the fuel cell power plant from the vehicle, connecting at least one voltage limiting device to a fuel cell stack power output of the fuel cell power plant, recycling of cathode exhaust to cathode flow field inlets, and turning off the air blower.

4. A method according to claim 1, further comprising:
after the fuel-on timer times out,
iv) starting an air blower and filling cathodes of the fuel cell power plant with air, and
v) closing a main load switch to connect the fuel cell power plant to the vehicle; and
wherein initiating the turn-off of the fuel cell fuel system includes opening the main load switch to disconnect the fuel cell power plant from the vehicle and connecting at least one voltage limiting device to a fuel cell stack power output of the fuel cell power plant, and
recycling cathode exhaust to cathode flow field inlets and turning off the air blower.

5. A method according to claim 1, further comprising:
upon time-out of the fuel-off timer, turning off the fuel cell thermal management system.

6. A method of operating a fuel cell, comprising:
filling anodes of the fuel cell with fuel using a fuel system of the fuel cell until the fuel cell is capable of providing a maximum output of the fuel cell;
simultaneously initiating a fuel-off timer and initiating a turn-off of the fuel system; and
simultaneously setting a fuel-on timer equal to the fuel-off timer and initiating filling the anodes of the fuel cell with fuel for a duration of the fuel-on timer.

* * * * *